E. C. AULD AND J. R. CAMPBELL.
PROCESS FOR TREATING ACID MINE WATER.
APPLICATION FILED MAY 8, 1916. RENEWED AUG. 21, 1918.
1,310,383.
Patented July 15, 1919.
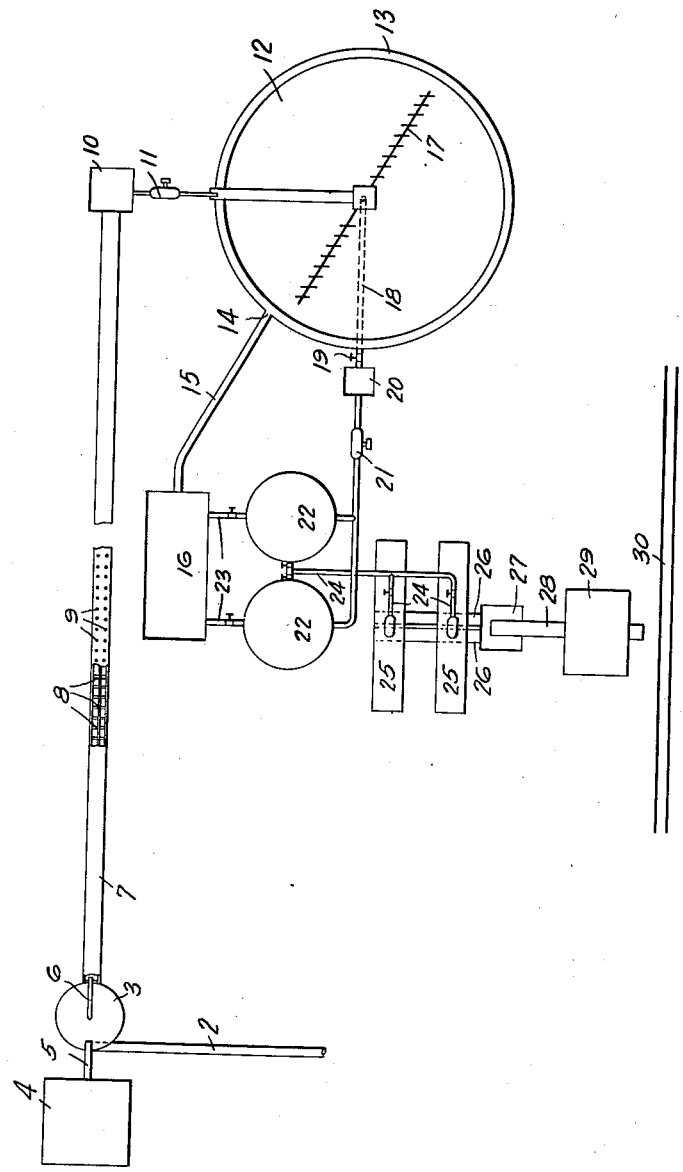
WITNESSES
INVENTOR

UNITED STATES PATENT OFFICE.

ELGIE C. AULD AND JAMES R. CAMPBELL, OF SCOTTDALE, PENNSYLVANIA.

PROCESS FOR TREATING ACID MINE-WATER.

1,310,383.  Specification of Letters Patent.  Patented July 15, 1919.

Application filed May 8, 1916, Serial No. 96,230. Renewed August 21, 1918. Serial No. 250,894.

*To all whom it may concern:*

Be it known that we, ELGIE C. AULD and JAMES R. CAMPBELL, citizens of the United States, and residents of Scottdale, in the county of Westmoreland and State of Pennsylvania, have invented certain new and useful Improvements in Processes for Treating Acid Mine-Water, of which the following is a specification.

Our invention relates to the treatment of the drainage water of mines, and more particularly relates to the treatment of acid drainage water of coal mines.

One object of our invention is to provide a process of treating the large quantities of acid water drained from coal mines, whereby the water is purified, and the precipitate is recovered as a by-product.

Another object of our invention is the provision of a novel process wherein the precipitate is recovered in condition to be dried in preparation for later use as a gas purifier or similar use requiring a product containing relatively small amounts of calcium sulfate ($CaSO_4$).

A further object of our invention is to provide a process of neutralizing acid mine water whereby neutralization of the water is facilitated and is regulated and controlled and whereby the effectiveness of the limestone or other calcareous material used as a neutralizing agent is materially increased.

Still further objects of our invention will become apparent as the invention is more fully described hereinafter.

The invention consists in the treatment of the mine water by a novel series of steps whereby the acid mine water is collected, the collected water is neutralized, and the neutralized water is agitated and aerated, and whereby the resultant sludge is precipitated and separated from the neutralized water, the addition of an excess of the calcareous material is prevented, and the precipitation of calcium sulfate is avoided and overcome.

The invention further consists in the novel steps whereby the precipitate is treated to remove surplus moisture, the precipitate is dried, and a by-product is produced in condition for use as a gas purifying agent and containing a minimum amount of calcium sulfate ($CaSO_4$).

The drawing forming part of this specification is a diagrammatic plan showing one arrangement of apparatus adapted for use in carrying out our improved process.

In the accompanying drawing, the numeral 2 designates a trough or conduit through which the raw acid mine water is conducted from the mine or from a series of mines and is dischaged into a tank or well 3. Preferably the incoming mine water is delivered tangentially from the discharge end of the conduit 2 into the tank or well in the manner shown, to thereby cause a swirling or rotative movement of the water within the tank or well.

At one side of the tank or well is a bin or hopper 4 having a chute or feed mechanism 5 of any suitable construction, by which pulverized or finely divided limestone or other calcareous material is introduced into the water within the well 3 in regulated or measured quantities, the amount of limestone changing with variations in the acidity of the water and being sufficient to neutralize the acid mine water.

In the Connellsville coal region the total apparent acidity of the mine water averages approximately 200 grains per U. S. gallon, of which from 10 to 20 per cent. is free sulfuric acid ($H_2SO_4$), or from 20 to 40 grains free acid per U. S. gallon. Obviously, the total acidity and the percentage of free sulfuric acid will vary in different mining districts.

The acidity, or percentage of free acid in the water being ascertained, and the amount of finely divided limestone or calcareous material necessary to mix with water of a given acidity being previously determined, the quantity of calcareous material will be carefully regulated so as to supply the amount necessary to neutralize the water in the tank or well without adding an excess and thereby causing the precipitation of calcium sulfate resulting from the addition of an excess of calcareous material.

In round numbers, a pound of pulverized or comminuted limestone, when the limestone is substantially pure, is required to neutralize each pound of free sulfuric acid. The iron salts being held in solution and in suspension by the free acid will be precipitated as a basic ferric sulfate, after neutralizing the mine water. As about one-third of the sulfuric anhydrid in the iron sulfate has to be broken down to secure good precipitation and coagulation of the hydrated oxid, the use of somewhat more than the theoretical amount of limestone or calcareous material will be found desirable in the practice of our improved method.

The limestone or other calcareous material introduced into the water by the feed mechanism 5 will be pulverized or ground, preferably to such degree of fineness that 85 per cent. will pass through a 200 mesh sieve, and 100 per cent. through a 100 mesh sieve, preparatory to putting the ground limestone in the hopper 4. The introduction of the limestone into the water within the tank or well 3, in a finely divided state, which enables a more intimate mixture being made, neutralizes the free sulfuric acid and precipitates the iron compounds in the water, or, more accurately, starts or causes incipient precipitation.

The neutralized mine water is then removed from the tank or well 3, preferably by means of a submerged siphon 6, and is discharged thereby into one end of a covered flume 7 of considerable length and having a series of baffles 8 and air passages 9 therein which cause agitation and aeration of the water while traveling through the flume. The flume 7 preferably is inclined lengthwise at such an angle to the horizontal as to cause the water to flow rapidly through the flume, ordinarily at the rate of about 150 feet per minute.

When found desirable or necessary, means will be employed for discharging compressed air into the neutralizing tank or well 2, and also into the flume 7, in order to increase the extent of aeration and agitation of the water, sufficient aeration being important in causing precipitation of the iron salts.

The water is discharged from the flume 7 into a sump 10 which is connected to the suction inlet of a pump 11 of suitable type and size to handle the volume of water available for treatment by our improved process. The pump withdraws the water from the sump 10 and discharges the neutralized and now pretty well coagulated water into a thickener 12, (a "Dorr" thickener preferably being used), and in passing through the thickener precipitation of the iron salts is completed and the sludge or precipitate is separated from the neutralized water. Care is taken that the water is delivered into the thickener without splashing and with the least possible amount of agitation.

The water remains in the thickener 12 for about one hour or until the sludge is precipitated to the bottom of the thickener and the water on top becomes clear, the clear water overflowing into a trough 13 encircling the thickener at its top, this trough having a discharge outlet 14 by which the clear water is led away from the thickener, through a pipe or trough 15 into a cistern or storage basin 16.

The sludge or precipitate at the bottom of the thickener 12 is gradually worked to the center of the thickener by means of suitable rotary arms or scrapers 17 which are arranged to revolve three to four times per hour or at such slow speed as will avoid agitation of the sludge or precipitate. By allowing a quantity of the sludge to accumulate on the bottom of the thickener 12 the water content of the sludge is lessened.

An alarm system may conveniently be used with the scrapers or arm 17 so as to indicate the thickness of the deposit on the bottom by the stress or strain put on the arms or scrapers when revolving through the sludge.

The thickener 12 is provided with a discharge opening on its bottom which is connected to one end of a conduit or tunnel 18, the conduit having a valve 19 for closing the discharge opening. The sludge flows from the thickener 12 by gravity, and is transferred through the conduit or tunnel 18 to a sump or sludge cistern 20. The valve 19 may be manipulated so as to permit of the sludge being continuously removed or the valve may be opened and closed at intervals so as to provide for the intermittent removal of the sludge from the thickener.

A pump 21 is employed to transfer the sludge, as it collects in the cistern 20, to secondary tanks 22, 22, wherein the sludge is allowed to settle for several hours and is separated from the supernatant water, this water being removed through drain pipes 23 leading from the tanks to the cistern or storage basin 16 in which the neutralized water is collected for further use.

The thickened sludge or precipitate is then conducted from the tanks 22 through the pipes 24 into the vacuum driers 25, 25, and further dehydrated therein so as to contain not more than 20 per cent. of water. The hydrated oxid is discharged from the driers 25 upon conveyers 26 and is delivered thereby into a collecting pit 27 from which it is transferred by an elevator 28 into a storage bin or hopper 29 from which it is loaded by gravity into cars positioned on the railway track 30 at one side of the storage bin.

The material or product obtained in carrying out our process is essentially a hydrated oxid of iron which is adapted for use in removing the hydrogen sulfid ($H_2S$) from illuminating and other gases, its value as a gas purifier depending upon the combined water in the material and the colloidal nature of the product, and also upon its iron content. As this material is marketable as a gas purifier, even when carrying as high as 20 per cent. free moisture, the drying process need be and ordinarily will be carried out only to such extent.

A typical analysis of the material obtained in carrying out our novel process is—

|  | Per cent. |
|---|---|
| Moisture at 105° C. | 12.41 |
| Water of constitution | 11.67 |
| Silica ($SiO_2$) | 4.18 |
| Alumina ($Al_2O_3$) | 4.06 |
| Ferric oxid ($Fe_2O_3$) | 48.11 |
| Ferrous oxid (FeO) | .91 |
| Lime (CaO) | 1.55 |
| Magnesia (MgO) | .08 |
| Sulfuric anhydrid ($SO_3$) | 15.35 |
| Carbon dioxid ($CO_2$) | .17 |
| Organic compounds | 1.51 |
|  | 100.00 |

The so-produced hydrated oxid of iron is mixed with sawdust, shavings, granulated slag or other suitable fluffing material in forming the commercial gas purifying sponge.

The advantages of our invention will be apparent to those skilled in the art. The steps of our improved process provide for the most effective use of the neutralizing agent and by feeding the limestone into the acid mine water in a finely divided state and in quantities regulated and determined by the degree of acidity of the water being treated, precipitation of calcium sulfate is prevented and overcome, while a material free from calcium sulfate is obtained and the necessity of washing out the calcium sulfate in order to make the material usable as a gas purifying agent is avoided and rendered unnecessary.

Modifications in the construction and arrangement of apparatus used in carrying out our improved process may be made within the scope of our invention.

The tanks or cisterns, the driers, and other apparatus, may be arranged to discharge the water from one to the succeeding part of the apparatus by gravity, and in this way avoid the use of pumps for lifting the water. A centrifuge filter wheel or circular drying apparatus may or may not be used with or in place of the vacuum driers shown. Any suitable means may be employed in crushing or powdering the limestone used in neutralizing the water and for drying the precipitate and other changes may be made without departing from the invention defined in the appended claims.

We claim:—

1. The herein described process of treating the acid drainage water of mines to neutralize the same and recover by-products therefrom, which consists in introducing measured quantities of finely divided calcareous material into the water to neutralize the acid in the water, then agitating and aerating the neutralized water, then precipitating the sludge, and then separating the precipitate from the body of neutralized water, and regulating the quantities of calcareous material mixed with the water with variations in the acidity of the water to thereby prevent the addition of an excess of calcareous material to the water and the precipitation of calcium sulfate.

2. The herein described process of treating the acid drainage water of mines to neutralize the same and recover by-products therefrom, which consists in introducing regulated quantities of finely divided limestone into the water to neutralize the acid in the water, then agitating and aerating the neutralized water, then precipitating the sludge and then collecting and separating the precipitate from the neutralized water and varying the qauntity of limestone mixed with the water to prevent the addition of an excess of limestone and the formation of calcium sulfate.

3. The process of treating acid mine water and recovering by-products therefrom, which consists in mixing powdered calcareous material with the water to neutralize the same, then precipitating the sludge in the neutralized water and drying the sludge, and varying the quantity of calcareous material used in neutralizing the water to suit the degree of acidity of the water to thereby prevent the addition of an excess thereof and resulting precipitation of calcium sulfate with the iron salts.

4. The herein described process of treating acid drainage water from mines to neutralize the same and recover by-products therefrom, which consists in mixing regulated quantities of finely divided calcareous materials with the water to neutralize the free acid, then agitating and aerating the neutralized water, then precipitating the sludge and separating the precipitate from the body of neutralized water, and then drying the precipitate.

In testimony whereof we have hereunto set our hands.

ELGIE C. AULD.
JAMES R. CAMPBELL.